(12) United States Patent
Lee et al.

(10) Patent No.: US 9,188,786 B2
(45) Date of Patent: Nov. 17, 2015

(54) OPTICAL COMPENSATION FILM

(71) Applicants: SAMSUNG ELECTRONICS CO., LTD., Suwon-si, Gyeonggi-do (KR); CHEIL INDUSTRIES INC., Kumi, Kyungsangbuk-do (KR)

(72) Inventors: Moon Yeon Lee, Osan-si (KR); Hee Kyung Kim, Seongnam-si (KR); Kyu Yeol In, Seoul (KR); Jae Hyun Kim, Seoul (KR); Hyung Jun Kim, Suwon-si (KR); Won Cheol Jung, Seoul (KR); Hyeon Ho Choi, Seoul (KR); Woo Joong Kim, Uiwang-si (KR); Kyoung Ah Oh, Seoul (KR)

(73) Assignees: SAMSUNG ELECTRONICS CO., LTD. (KR); CHEIL INDUSTRIES INC. (KR)

( * ) Notice: Subject to any disclaimer, the term of this patent is extended or adjusted under 35 U.S.C. 154(b) by 513 days.

(21) Appl. No.: 13/690,913

(22) Filed: Nov. 30, 2012

(65) Prior Publication Data

US 2013/0141785 A1 Jun. 6, 2013

(30) Foreign Application Priority Data

Dec. 2, 2011 (KR) .......................... 10-2011-0128645

(51) Int. Cl.
*G02B 5/30* (2006.01)
*G02B 27/28* (2006.01)
(Continued)

(52) U.S. Cl.
CPC ................ *G02B 27/12* (2013.01); *B32B 27/08* (2013.01); *B32B 27/302* (2013.01); *B32B 27/32* (2013.01); *G02B 5/3025* (2013.01); *G02B 5/3083* (2013.01); *G02B 5/32* (2013.01); *G02B 27/0018* (2013.01); *G02B 27/10* (2013.01);
(Continued)

(58) Field of Classification Search
CPC ........ G02B 5/3083; G02B 5/32; G02B 27/28; G02F 1/133634
USPC ............. 359/489.03, 489.07, 489.12, 489.15, 359/489.16, 489.17, 615; 349/119, 120
See application file for complete search history.

(56) References Cited

U.S. PATENT DOCUMENTS 6,819,381 B2   11/2004   Mi et al.
8,821,994 B2   9/2014    Harris et al.
(Continued)

FOREIGN PATENT DOCUMENTS

JP   2004-325971 A   11/2004
JP   2011-126084 A   6/2011
(Continued)

OTHER PUBLICATIONS

Korean Office Action for Korean Patent Applidation No. 10-2011-0128645 dated Jul. 25, 2014 with English Translation.
(Continued)

*Primary Examiner* — Ricky D Shafer
(74) *Attorney, Agent, or Firm* — Cantor Colburn LLP

(57) ABSTRACT

An optical compensation film includes: a first layer having positive birefringence; a second layer on the first layer and having negative birefringence; and a third layer on the second layer and having positive birefringence. A retardation value of the optical compensation film for incident light having a wavelength of about 550 nm is about 135 nm to about 145 nm, and a ratio of a thickness of the first layer or of the third layer to a thickness of the second layer is about 1.1 to 2.2.

22 Claims, 15 Drawing Sheets

(51) Int. Cl.
  *G02F 1/1335* (2006.01)
  *G02B 27/12* (2006.01)
  *G02B 27/10* (2006.01)
  *G02B 27/26* (2006.01)
  *G02B 5/32* (2006.01)
  *G02F 1/13363* (2006.01)
  *G02B 27/00* (2006.01)
  *B32B 27/32* (2006.01)
  *B32B 27/08* (2006.01)
  *B32B 27/30* (2006.01)
  *G09G 3/36* (2006.01)

(52) U.S. Cl.
  CPC ............... *G02B 27/26* (2013.01); *G02B 27/28* (2013.01); *G02F 1/13363* (2013.01); *G02F 1/133634* (2013.01); *G09G 3/36* (2013.01); B32B 2307/42 (2013.01); G02F 2413/03 (2013.01); G02F 2413/07 (2013.01); G02F 2413/13 (2013.01); G02F 2413/14 (2013.01); G09G 2300/0491 (2013.01)

(56) References Cited

U.S. PATENT DOCUMENTS

| | | | | |
|---|---|---|---|---|
| 2002/0005925 A1* | 1/2002 | Arakawa | .................... | 349/117 |
| 2002/0060762 A1 | 5/2002 | Arakawa | | |
| 2002/0135728 A1* | 9/2002 | Tatsuta et al. | ............... | 349/158 |
| 2004/0041968 A1* | 3/2004 | Otoshi et al. | ................. | 349/117 |
| 2004/0051831 A1 | 3/2004 | Su Yu et al. | | |
| 2004/0135949 A1* | 7/2004 | Maeda | ......................... | 349/119 |
| 2006/0221280 A1* | 10/2006 | Oka et al. | ..................... | 349/117 |
| 2007/0242188 A1* | 10/2007 | Sakai | .............. | 349/96 |
| 2009/0009702 A1* | 1/2009 | Chidate | ....................... | 349/120 |
| 2009/0066886 A1* | 3/2009 | Shimizu et al. | ................. | 349/96 |
| 2010/0168409 A1 | 7/2010 | Fujita | | |
| 2011/0051062 A1* | 3/2011 | Sakai | ........................... | 349/120 |
| 2014/0211311 A1 | 7/2014 | Harris et al. | | |

FOREIGN PATENT DOCUMENTS

| | | |
|---|---|---|
| KR | 10250020038550 A | 5/2002 |
| KR | 1020030089499 A | 11/2003 |
| KR | 102005007492 A | 7/2005 |
| KR | 1020080083149 A | 9/2008 |
| KR | 10 20100015907 A | 2/2010 |
| KR | 1020100050827 A | 5/2010 |

OTHER PUBLICATIONS

Yuri M. Boiko, "New Simple Method of Measuring the Surface Glass Transition Temperature of Polymers", Journal of Polymer Science: Part B, Polymer Physics, vol. 48, 2010, pp. 2012-2021.

Uchiyama et al., "Molecular orientation of Aromatic Polycarbonates Containing Fluorene Side Chains by Polarized Infrared Spectroscopy and Birefringence Analysis", Journal of Polymer Science: Part B: Polymer Physics, vol. 41, 2003, pp. 1554-1562.

Korean Decision of Allowance for Patent for Korean Patent Application No. 10-2011-0128645 dated Apr. 27, 2015.

* cited by examiner

Δa*b* = 19.7

Δa*b* = 6.2

Δa*b* = 4.0

Δa*b* = 5.0

OPTICAL COMPENSATION FILM

CROSS-REFERENCE TO RELATED APPLICATIONS

This application claims priority to Korean Patent Application No. 10-2011-0128645 filed on Dec. 2, 2011, and all the benefits accruing therefrom under 35 U.S.C. §119, the entire contents of which are incorporated herein by reference.

BACKGROUND

1. Field

Provided is an optical compensation film.

2. Description of the Related Art

Flat panel displays may be classified into emitting display devices that emit light by themselves and non-emitting display devices that require separate light sources. Optical compensation films such as phase difference films may be often used for improving image quality of the flat panel displays.

In an emitting display device, for example, an organic light emitting display, visibility and contrast ratio may be decreased due to reflection of external light by metal such as an electrode in the display device. In order to reduce such deterioration, a polarizing plate and a phase difference film are used to prevent the external light reflected in the display device from leaking out of the display device.

In a liquid crystal display ("LCD"), which is a kind of non-emitting display device, elliptical polarization and light leakage may occur due to birefringence of liquid crystal and crossed polarizing plates in the display device, thereby decreasing contrast ratio and causing color shift. An optical compensation film may convert the elliptical polarization into a circular polarization to improve the image quality of the display device.

However, developed optical compensation films may have strong dependency on the wavelength of incident light such that their operation may be proper only for particular wavelengths, but insufficient for other wavelengths.

SUMMARY

Provided is an embodiment of an optical compensation film which includes: a first layer having positive birefringence; a second layer on the first layer and having negative birefringence; and a third layer on the second layer and having positive birefringence. A retardation value of the optical compensation film for incident light having a wavelength of about 550 nanometers (nm) is about 135 nm to about 145 nm, and a ratio of a thickness of the first layer or of the third layer to a thickness of the second layer is about 1.1 to 2.2.

A difference of the thickness of the first layer and the thickness of the third layer may be equal to or smaller than about 2 microns ($\mu m$).

A refractive constant ($N_z$) of the optical compensation film may be about 1.

The first layer and the third layer may include at least one of a cyclo-olefin homopolymer ("COP") and cyclo-olefin copolymer ("COC").

The second layer may include a denatured polystyrene which includes a copolymer resin including styrene repeating units in an amount equal to or greater than about 80 mol %.

The second layer may include styrene maleic anhydride ("SMA").

The first layer and the third layer may include COP, and the second layer may include SMA.

A thickness of each of the first layer and the third layer may be about 37 $\mu m$ to about 64 $\mu m$, and a thickness of the second layer may be about 22 $\mu m$ to about 53 $\mu m$.

A long wavelength dispersion of the optical compensation film is defined as a ratio of a retardation value for incident light having a wavelength of about 650 nm to a retardation value for incident light having a wavelength of about 550 nm, and may be about 1.04 to about 1.12. A short wavelength dispersion of the optical compensation film is defined as a ratio of a retardation value for incident light having a wavelength of about 450 nm to the retardation value for incident light having a wavelength of about 550 nm, and may be about 0.79 to about 0.9.

Provided is another embodiment of an optical compensation film which includes: a first layer having positive birefringence; a second layer on the first layer and having negative birefringence; and a third layer on the second layer and having positive birefringence. A retardation value of the compensation film for incident light having a wavelength of about 550 nm is about 135 nm to about 145 nm. A thickness of each of the first layer and the third layer is about 37 $\mu m$ to about 64 $\mu m$, and a thickness of the second layer is about 22 $\mu m$ to about 53 $\mu m$.

A difference between the thickness of the first layer and the thickness of the third layer may be equal to or smaller than about 2 $\mu m$, and a refractive constant ($N_z$) of the optical compensation film may be about 1.

The first layer and the third layer may include at least one of COP and COC, and the second layer may include a denatured polystyrene which includes a copolymer resin including styrene repeating units in an amount equal to or greater than about mole percent (80 mol %).

Provided is another embodiment of an optical compensation film which includes a first material having positive birefringence; and a second material having negative birefringence. A reference wavelength retardation value of the optical compensation film is a retardation value for incident light having a wavelength of about 550 nm and is about 135 nm to about 145 nm.

A long wavelength dispersion of the optical compensation film is defined as a ratio of a retardation value for incident light having a wavelength of about 650 nm to the reference wavelength retardation value, and may be equal to or greater than about 1.04.

A short wavelength dispersion of the optical compensation film is defined as a ratio of a retardation value for incident light having a wavelength of about 450 nm to the reference wavelength retardation value, and may be equal to or lower than about 0.9.

The long wavelength dispersion of the optical compensation film may be about 1.04 to about 1.12, and the short wavelength dispersion of the optical compensation film may be about 0.79 to about 0.9.

A refractive constant ($N_z$) of the optical compensation film may be about 1, the first material may include COP, and the second material may include SMA.

The first material may define a first layer and a second layer, the second material may define a third layer between the first layer and the second layer, and a ratio of a thickness of one of the first layer and the second layer to a thickness of the third layer may be about 1.1 to about 2.2.

Provided is an embodiment of a display device according to an embodiment includes: a display panel including a pair of electrodes and a medium layer; and an optical compensation layer on a surface of the display panel. The optical compensation layer includes: a first layer having positive birefringence; a second layer on the first layer and having negative birefringence; and a third layer on the second layer and having positive birefringence. A retardation value of the optical compensation layer for incident light having a wavelength of about 550 nm is about 135 nm to about 145 nm. A ratio of a thickness of the first layer or of the third layer to a thickness of the second layer is about 1.1 to 2.2.

The thickness of each of the first layer and the third layer may be about 37 μm to about 64 μm, and the thickness of the second layer may be about 22 μm to about 53 μm.

A long wavelength dispersion of the optical compensation layer is defined as a ratio of a retardation value for incident light having a wavelength of about 650 nm to the retardation value for incident light having a wavelength of about 550 nm and may be about 1.04 to about 1.12. A short wavelength dispersion of the optical compensation layer is defined as a ratio of a retardation value for incident light having a wavelength of about 450 nm to the retardation value for incident light having a wavelength of about 550 nm and may be about 0.79 to about 0.9.

The display device may further include a polarization layer on the optical compensation layer.

The medium layer may include organic light emitting material.

According to one or more embodiments of the optical compensation film or layer, even when external light is reflected in a display device including the film or layer, leaking of the reflected light from the display device is reduced or effectively prevented, thereby improving the image quality of the display device

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Figure 1:
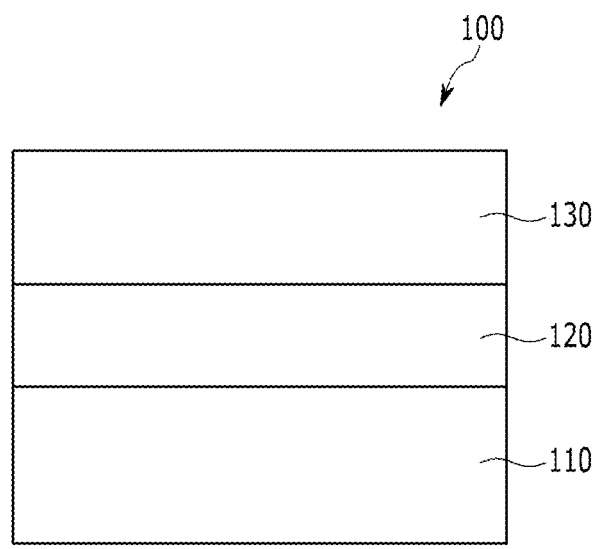
FIG. 1 is a schematic cross-sectional view of an embodiment of an optical compensation film for a display device.

Aspects of one or more of the embodiments will be described more fully hereinafter with reference to the accompanying drawings. As those skilled in the art would realize, the described embodiments may be modified in various different ways, all without departing from the spirit or scope. In the drawing, parts having no relationship with the explanation are omitted for clarity, and the same or similar reference numerals designate the same or similar elements throughout the specification.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

An optical compensation film such as for a display device is described in detail with reference to FIG. 1.

FIG. 1 is a schematic cross-sectional view of an embodiment of an optical compensation film for a display device.

Referring to FIG. 1, an optical compensation film 100 includes three layers, but the invention is not limited thereto or thereby. The three layers may include a lower layer 110 and an upper layer 130 that have positive birefringence, and an intermediate layer 120 disposed between the lower layer 110 and the upper layer 130. The intermediate layer may have negative birefringence. The lower layer 110 and the upper layer 130 may have optical axes substantially perpendicular to an optical axis of the intermediate layer 120. The optical compensation film 100 may further include a passivation layer (not shown) disposed on the upper layer 130, or alternatively, the passivation layer may be omitted.

The optical compensation film 100 may have a retardation value for incident light having a wavelength of about 550 nanometers (nm). This retardation value may hereinafter be referred to as "reference wavelength retardation value." The reference wavelength retardation value may be about 135 nm to about 145 nm. A long wavelength dispersion of the optical compensation film 100, which is a ratio of a retardation value for incident light having a wavelength of about 650 nm over the reference wavelength retardation value, may be equal to or greater than about 1.04, and further, may be about 1.04 to about 1.12. A short wavelength dispersion of the optical compensation film 100, which is a ratio of a retardation value for incident light having a wavelength of about 450 nm over the reference wavelength retardation value, may be equal to or smaller than about 0.9, and further, may be about 0.79 to about 0.90. Hereinafter, the retardation value for incident light having the wavelength of about 650 nm is referred to as "long wavelength retardation," and the retardation value for incident light having wavelength of about 450 nm is referred to as "short wavelength retardation."

The optical compensation film 100 may have a function of circular polarization, and may have a refraction constant $N_z$ of about 1, which is defined by $N_z=(n_x-n_z)/(n_x-n_y)$ where $n_x$, $n_y$, and $n_z$ are refractive coefficients in x, y, and z directions, respectively. According to another embodiment, the optical compensation film 100 may have a function of elliptical polarization.

Examples of materials having positive birefringence for the lower layer 110 and the upper layer 130 include resins such as a cyclo-olefin homopolymer (COP) and/or cyclo-olefin copolymer (COC). Each of the lower layer 110 and the upper layer 130 may include at least one of COP and COC. Materials having negative birefringence for the intermediate layer 120 include denatured polystyrene resin, for example, a copolymer resin of styrene and an unsaturated monomer. As used herein, "denatured" refers to a copolymer of polystyrene having modified properties imparted by the inclusion of one or more additional monomers. An example thereof includes a copolymer resin of styrene and alicyclic monomer including an unsaturated group, such as for example, styrene maleic anhydride (SMA) copolymer. The denatured polystyrene may include a copolymer resin including styrene repeating units in an amount equal to or greater than about 80 mole percent (mol %).

A thickness ratio defined by the thickness of the lower layer 110 (or by the thickness of the upper layer 130) relative to (e.g., over) the thickness of the intermediate layer 120, may be about 1.1 to about 2.2. The thicknesses of the lower layer 110 and the upper layer 130 may be substantially equal to each other. A difference between the thickness of the lower layer 110 and the thickness of the upper layer 130 may be equal to or less than about 2 microns (μm). If the difference between the thickness of the lower layer 110 and the thickness of the upper layer 130 is greater than about 2 μm, a thinner one of the two layers 110 and 130 may be removed or omitted.

The embodiment of the optical compensation film 100 may be formed by co-extruding a positive birefringence material and a negative birefringence material, stacking the positive birefringence material for the lower layer 110, the negative birefringence material for the intermediate layer 120 and the positive birefringence material for the upper layer 130 in sequence, and then elongating the stack of materials to form the layers 110, 120 and 130. Before elongation, a thickness of each of the positive birefringence materials for lower layer 110 and the upper layer 130 may be about 50 μm to about 85 μm, a thickness of the negative birefringence material for intermediate layer 120 may be about 30 μm to about 70 μm, and a total thickness of the first to third material layers 110, 120 and 130 may be about 135 μm to about 240 μm. After elongation, a thickness of each of the lower layer 110 and the upper layer 130 may be about 37 μm to about 64 μm, a thickness of the intermediate layer 120 may be about 22 μm to about 53 μm, and a total thickness of the first to third layers 110, 120 and 130 may be about 100 μm to about 180 μm, which may be about 70% to about 80% of the entire thickness of the first to third material layers 110, 120 and 130 before elongation.

As described above, the reference wavelength retardation value of the optical compensation film 100 may be about 135 nm to about 145 nm, which is roughly a quarter of the wavelength of incident light having a wavelength of about 550 nm. The long wavelength dispersion of the optical compensation film 100, which is defined by a ratio of the retardation value for incident light having a wavelength of about 650 nm over the retardation value for incident light having a wavelength of about 550 nm (e.g., "reference wavelength retardation value"), may be equal to or greater than about 1.04, which is close to the ratio of the two wavelengths, 650/550≈1.18. Therefore, the retardation value for incident light having a wavelength of about 650 nm may be close to a quarter of the wavelength of incident light having a wavelength of about 650 nm.

The short wavelength dispersion of the optical compensation film 100, which is defined by a ratio of the retardation value for incident light having a wavelength of about 450 nm over the retardation value for incident light having a wavelength of about 550 nm (e.g., "reference wavelength retardation"), may be equal to or smaller than about 0.9, which is close to the ratio of the two wavelengths, 450/550≈0.82. Therefore, the retardation value for incident light having a wavelength of about 450 nm may be close to a quarter of the wavelength of incident light having a wavelength of about 450 nm.

According to an alternative embodiment, the lower layer 110 and the upper layer 130 may be incorporated into a single layer having positive birefringence. In this case, the optical compensation film 100 may have a dual-layered structure including a layer with positive birefringence (referred to as "positive birefringence layer" hereinafter) and another layer with negative birefringence (referred to as "negative birefringence layer" hereinafter).

The single positive birefringence layer may have a thickness substantially equal to a sum of the thicknesses of the lower layer 110 and the upper layer 130 shown in FIG. 1. A thickness ratio defined by a thickness of the single positive birefringence layer over a thickness of the negative birefringence layer may be about twice the thickness ratio defined by a thickness of the lower layer 110 (or the upper layer 130) over a thickness of the intermediate layer 120 shown in FIG. 1. In this alternative embodiment, the reference wavelength retardation value, the long wavelength dispersion, and the short wavelength dispersion may be nearly equal to those in the previous embodiment described with reference to FIG. 1. However, the difference between the thickness of the single positive birefringence layer and the thickness of the negative birefringence layer may increase to cause undesirable bending of the optical compensation film.

An embodiment of a display device is described in detail with reference to FIG. 2.

Figure 2:
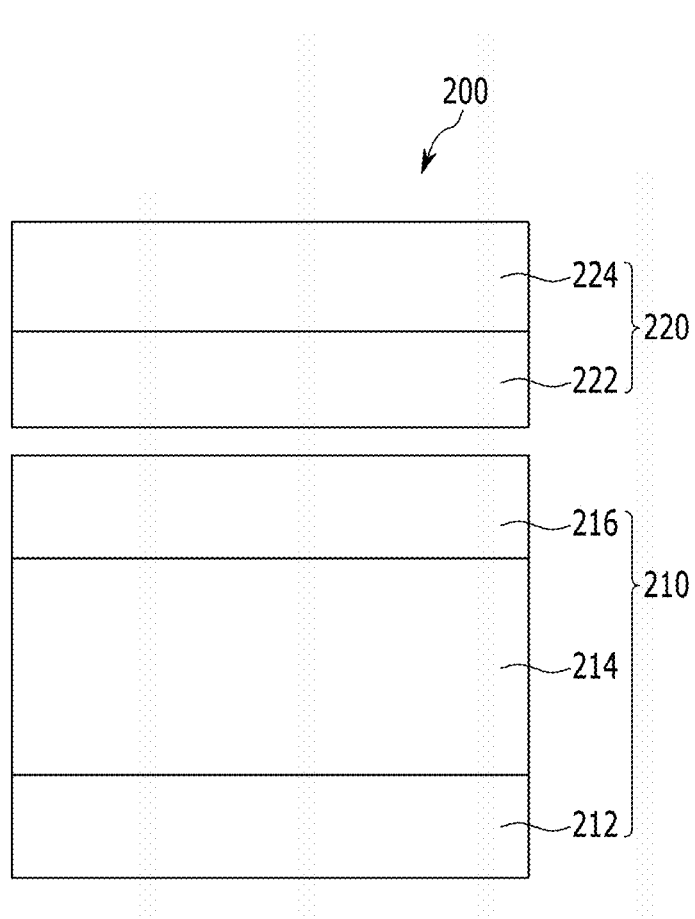
FIG. 2 is a schematic cross-sectional view of an embodiment of a display device.
Figure 3:
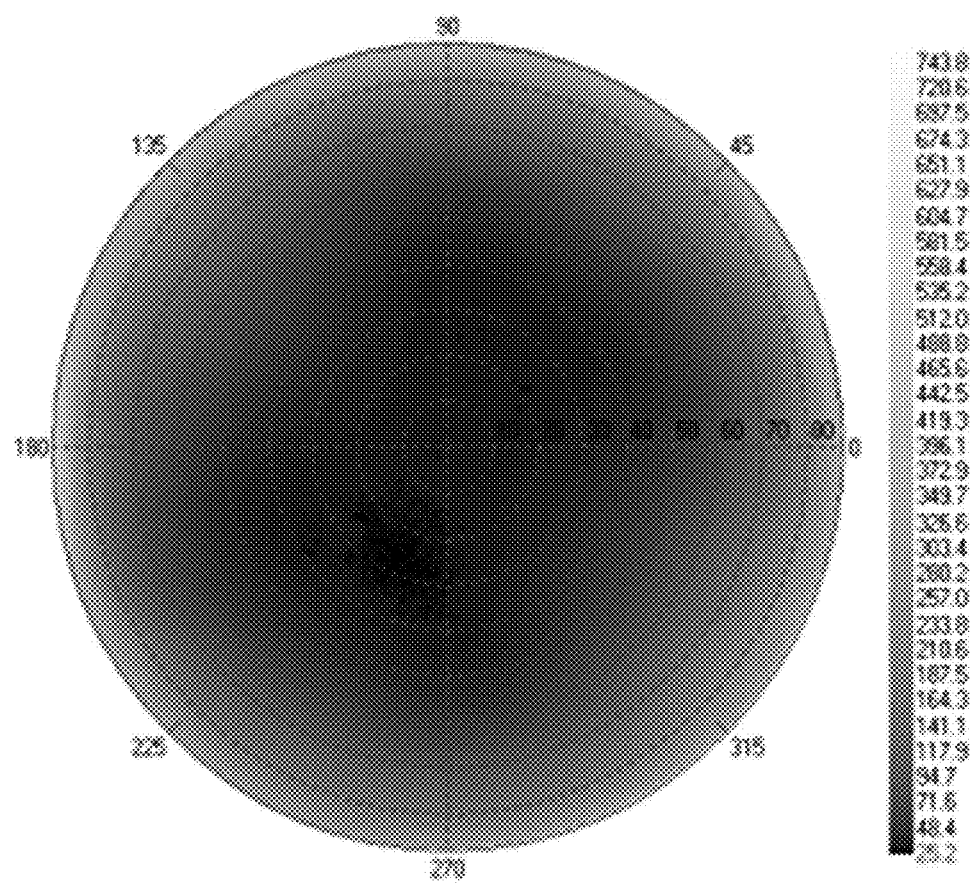
FIGS. 3 to 6 are graphs showing reflective luminance for experimental optical compensation films and comparative optical compensation films.
Figure 4:
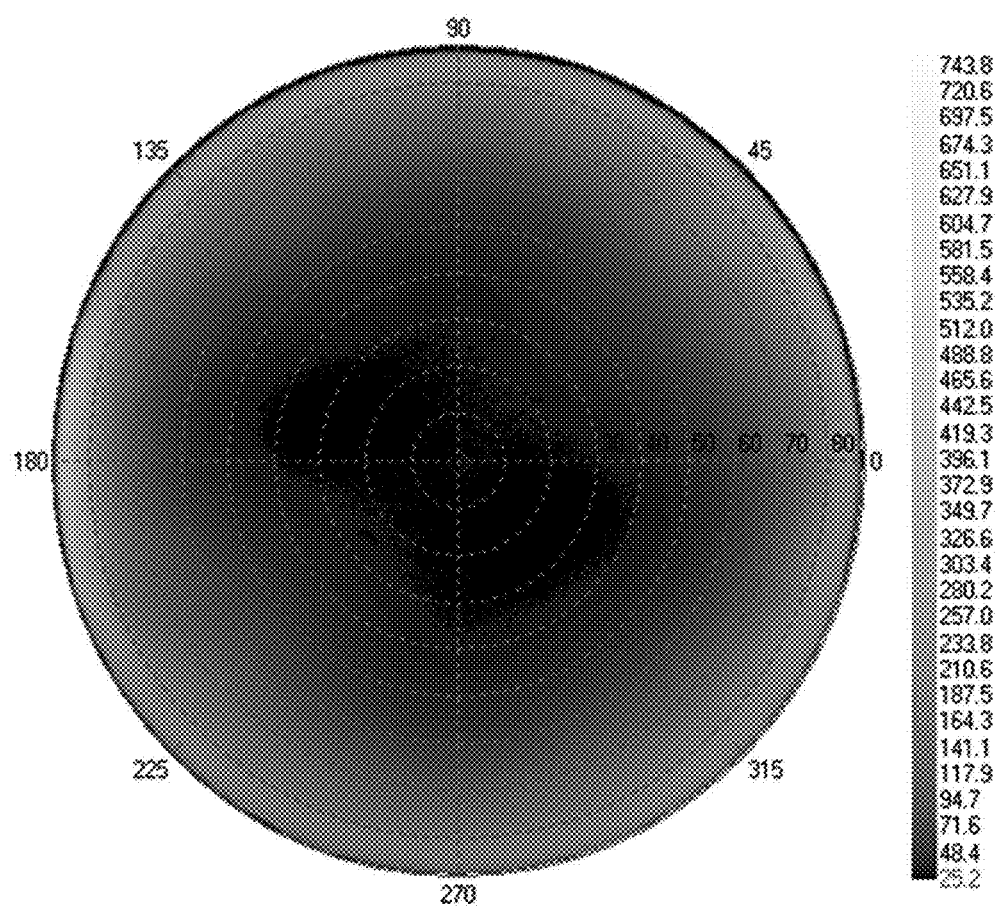
Figure 5:
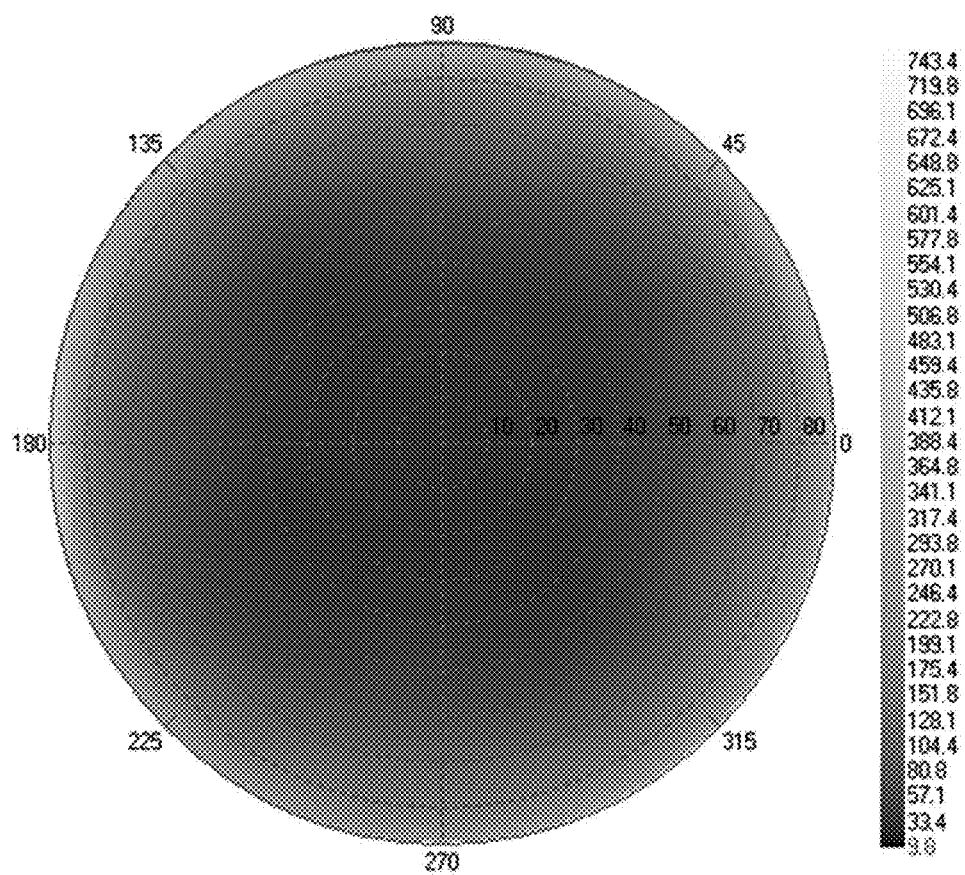

FIG. 2 is a schematic cross-sectional view of an embodiment of a display device.

A display device 200 may include a display panel 210 displaying images, and an anti-reflection film 220 disposed on the display panel 210.

The display panel 210 may include a lower electrode 212, an upper electrode 216, and a medium layer 214 disposed between the lower and upper electrodes 212 and 216.

If the display device 200 is an organic light emitting display, for example, the medium layer 214 may include organic light emitting material. When the two electrodes 212 and 216 are supplied with voltages, a current flows in the medium layer 214 to generate light. The lower electrode 212 may include an opaque metal, etc., in order to prevent the light generated in the medium layer 214 from leaking. The upper electrode 216 may include a transparent conducting material, for example, indium-tin oxide ("ITO") or indium-zinc oxide ("IZO"), in order for the generated light to pass through, but the invention is not limited thereto or thereby.

The anti-reflection film 220 may include an optical compensation layer 222 and a polarization layer 224. The optical compensation layer 222 may include any one of the embodiments of the optical compensation film 100 disclosed herein. The optical compensation layer 222 is closer to the display panel 210 than the polarization layer 224, and a polarization layer 224 may be farther from the display panel 210 than optical compensation layer 222. The two layers 222 and 224 may be respectively formed as films, for example, as a thin sheet or layer.

The optical compensation layer 222 may have a function of circular polarization, and the reference wavelength retardation value thereof may be about 135 nm to about 145 nm. The long wavelength dispersion of the optical compensation layer 222 may be equal to or greater than about 1.04, and further, may be about 1.04 to about 1.12. The short wavelength dispersion of the optical compensation layer 222 may be equal to or lower than about 0.9, and further, may be about 0.79 to about 0.90.

The optical compensation layer 222 may include a material having positive birefringence and another material having negative birefringence. The optical compensation layer 222 may have a triple-layered structure like the optical compensation film 100 shown in FIG. 1, but also may be single-layered, double-layered, or quadruple- or more layered.

As described with reference to FIG. 1, considering the reference wavelength retardation value, the long wavelength dispersion, and the short wavelength dispersion, the optical compensation layer 222 according to one or more embodiments may retard incident light by about a quarter of the wavelength of the incident light.

In the display device 200, external light may pass through the anti-reflection film 220 to enter the display panel 210 and then may be reflected by the upper electrode 216. In this case, the external light may be linearly polarized after passing through the polarization layer 224. The linear polarization may be converted into a circular polarization by the optical compensation layer 222. In this case, the linearly polarized light may be circularly polarized after passing through the optical compensation layer 222. Hence, the initial external incident light may experience a retardation of about a quarter wavelength and the phase of the initial external incident light may be changed by about 45 degrees.

After passing through the optical compensation layer 222, the circularly polarized external light may be reflected by the lower electrode 212 back towards the anti-reflection film 220, and then may pass through the optical compensation layer 222 again. Here, the light reflected by the lower electrode 212 may experience a retardation of about a quarter wavelength and the phase of the circularly polarized light may be changed by about 45 degrees. Then, the circular polarization of the light may be converted into a linear polarization and the phase of the light may be changed by about 45 degrees. As a result, the external light initially incident on the display panel 200 after firstly passing through the polarization layer 224 may pass through the optical compensation layer 222 twice to experience a phase change of about 90 degrees such that transmittance of the changed external light may be limited by the polarization layer 224 and the changed external light may fail to transmit out of the display panel 200. As a result, even when external light is reflected in a display device including the display panel 200, leaking of the reflected light from the display device is reduced or effectively prevented, thereby improving the image quality of the display device.

The anti-reflection film 220 including the optical compensation layer 222 may be used in flat panel displays such as a liquid crystal display ("LCD") other than an organic light emitting display.

Now, experimental examples of an optical compensation film are described in detail.

First, referring to FIG. 1, several optical compensation films 100 were manufactured by co-extrusion and elongation. In detail, each of the optical compensation films 100 had a triple-layered structure including a lower layer 110, an intermediate layer 120 and an upper layer 130. The thicknesses of the layers 110, 120 and 130 were different in a film-by-film basis. The lower layer 110 and the upper layer 130 were made from COP including an acrylic group, and the intermediate layer 120 was made from SMA having good adhesion with COP. The refractive constant $N_z$ of each of the optical compensation films 100 was about 1.

Then, the reference wavelength retardation value, the long wavelength dispersion, and the short wavelength dispersion were measured for each of the optical compensation films 100. Table 1 shows the result thereof.

TABLE 1

| | before elongation | | wavelength dispersion | |
|---|---|---|---|---|
| | total film | after elongation | | |
| thickness ratio | thickness (μm) | total thickness (μm) | short wavelength | long wavelength |
| 1.21 | 240 | 180 | 0.81 | 1.11 |
| 1.42 | 230 | 173 | 0.82 | 1.1 |
| 1.60 | 223 | 167 | 0.84 | 1.09 |
| 1.70 | 220 | 165 | 0.86 | 1.07 |
| 1.89 | 215 | 161 | 0.89 | 1.05 |
| 2.13 | 210 | 158 | 0.9 | 1.04 |
| 1.30 | 180 | 135 | 0.82 | 1.12 |

TABLE 1-continued

| before elongation | | | | |
|---|---|---|---|---|
| | total film | after elongation | wavelength dispersion | |
| thickness ratio | thickness (μm) | total thickness (μm) | short wavelength | long wavelength |
| 1.44 | 175 | 131 | 0.86 | 1.08 |
| 1.63 | 170 | 128 | 0.87 | 1.07 |
| 1.86 | 165 | 124 | 0.9 | 1.04 |
| 1.22 | 155 | 116 | 0.79 | 1.1 |
| 1.45 | 148 | 111 | 0.81 | 1.08 |
| 1.57 | 145 | 109 | 0.84 | 1.07 |
| 1.83 | 140 | 105 | 0.89 | 1.05 |
| 1.11 | 145 | 109 | 0.82 | 1.09 |
| 1.25 | 140 | 105 | 0.86 | 1.07 |
| 1.43 | 135 | 101 | 0.89 | 1.05 |

In Table 1, the thickness ratio denotes the thickness of the lower layer 110 or the upper layer 130 over the thickness of the intermediate layer 120. When the difference of the thickness of the lower layer 110 and the thickness of the upper layer 130 was greater than about 2 μm, the thinner one of the two layers 110 and 130 was removed and those cases were omitted in Table 1.

Referring to Table 1, when the thickness ratio was in a range between about 1.1 and about 2.2, the retardation value for incident light having a wavelength of about 550 nm (e.g., reference wavelength retardation value) was about 135 nm to about 145 nm, the long wavelength dispersion was about 1.04 to about 1.12, and the short wavelength dispersion was about 0.79 to about 0.9.

When the thickness ratio was smaller than about 1.1, the retardation value for incident light having a wavelength of about 550 nm was not within the range between about 135 nm and about 145 nm. When the thickness ratio was greater than about 2.2, the short wavelength dispersion was greater than about 0.9.

The initial thickness of each of the lower layer 110 and the upper layer 130 before elongation was about 50 μm to about 85 μm, and the initial thickness of the intermediate layer 120 was about 35 μm to about 70 μm. After elongation, the thickness of each layer 110, 120 or 130 was decreased to about 75% of the initial thickness before elongation.

Next, other experimental examples and comparative examples of an optical compensation film are described in detail with reference to FIGS. 3 to 15.

Figure 14:
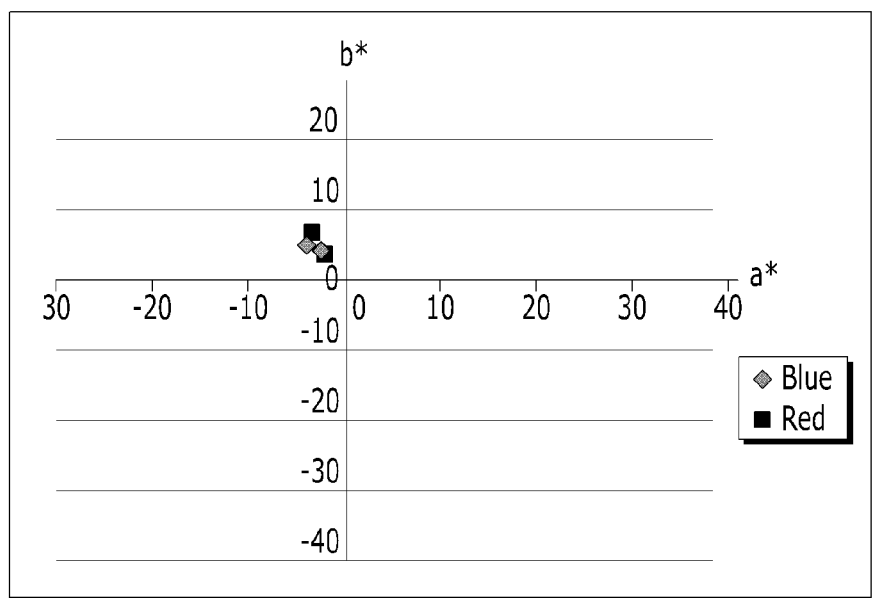
Figure 15:
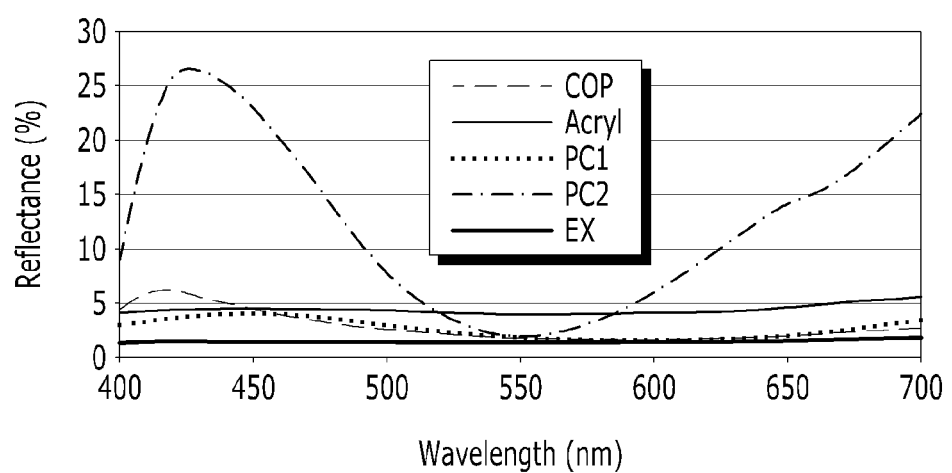
FIG. 15 is a graph showing a spectrum of reflectance (in percent, %) versus wavelength (in nanometers, nm) for an incident angle of about 8 degrees for experimental optical compensation films and comparative optical compensation films.

FIGS. 3 to 6 are graphs showing reflective luminance for experimental optical compensation films and comparative optical compensation films, FIGS. 7 to 10 are graphs showing reflective color for experimental optical compensation films and comparative optical compensation films, FIGS. 11 to 14 are graphs showing color coordinates representing reflective color for incident angle of about 8 degrees for experimental optical compensation films and comparative optical compensation films, and FIG. 15 is a graph showing reflectance spectrum for incident angle of about 8 degrees for experimental optical compensation films and comparative optical compensation films.

First, referring to FIG. 1, an optical compensation film 100 having a triple layered structure including a lower layer 110 having a thickness of about 85 μm, an upper layer 130 having a thickness of about 85 μm, and an intermediate layer 120 having a thickness of about 53 μm was manufactured by co-extrusion and elongation, as an experimental example. A material for the lower layer 110 and the upper layer 130 was COP including an acrylic group, and a material for the intermediate layer 120 was SMA having good adhesion with COP. The refractive constant $N_z$ of the optical compensation film 100 was about 1.

Next, optical compensation films including COP, acryl, and polycarbonate ("PC") and having refractive constant $N_z$ of about 1 were prepared as comparative examples.

Then, the reference wavelength retardation value, the long wavelength dispersion, and the short wavelength dispersion were measured for each of the experimental and comparative examples of the optical compensation film. Table 2 shows the result thereof.

TABLE 2

| case | reference wavelength retardation value | short wavelength dispersion | long wavelength dispersion |
|---|---|---|---|
| COP | 141 | 1.01 | 0.99 |
| Acryl | 140 | 0.9 | 1.03 |
| PC1 | 145 | 0.9 | 1.03 |
| PC2 | 137 | 1.07 | 0.96 |
| EX | 139 | 0.84 | 1.09 |

In Table 2, COP and Acryl denote comparative optical compensation films including COP and acryl, respectively, PC1 and PC2 denote comparative optical compensation films that include PC and are different from each other, and EX denotes the experimental optical compensation film.

As shown in Table 2, the long wavelength dispersion of the comparative compensation films is at most about 1.03 which is much smaller than an ideal value of about 1.18, and the short wavelength dispersion thereof is relatively large compared with an ideal value of about 0.82. The optical properties of EX are much closer to the ideal values than the comparative examples, and thus the experimental compensation film may be superior to the comparative compensation films.

Next, reflective luminance and reflective color were measured for the optical compensation films except for PC2, and their reflective luminance and reflective color for incident angle of about 8 degrees were compared with each other. The measurement was carried by using EZ Contrast (manufactured by ELDIM company) in a reflective mode with a general mirror as a reflector and a standard illuminant of D65 as a reflective light source.

Figure 6:
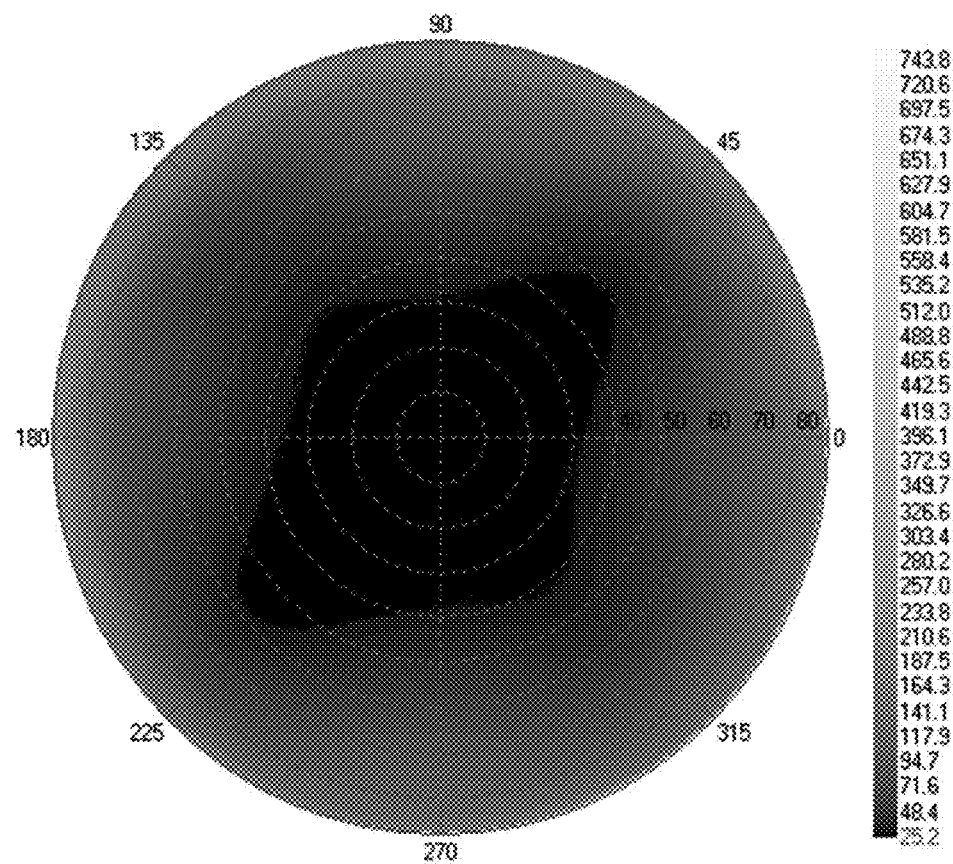
Figure 7:
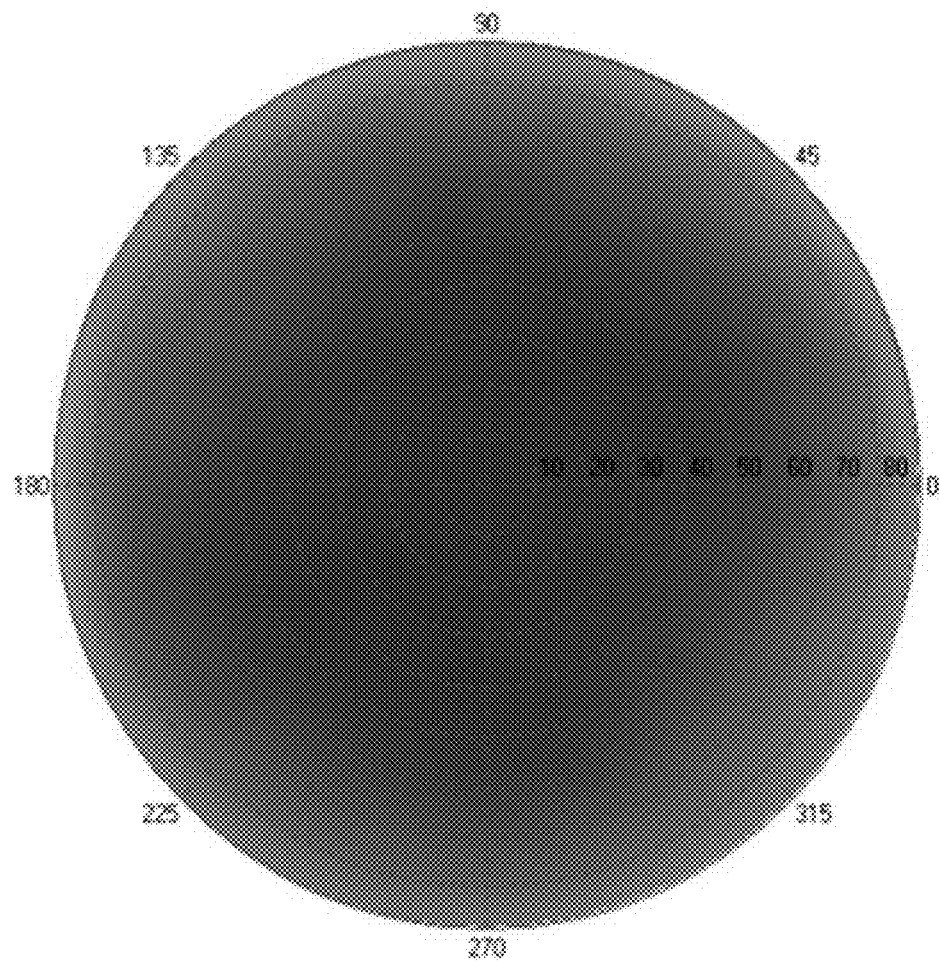
FIGS. 7 to 10 are graphs showing reflective color for experimental optical compensation films and comparative optical compensation films.
Figure 8:
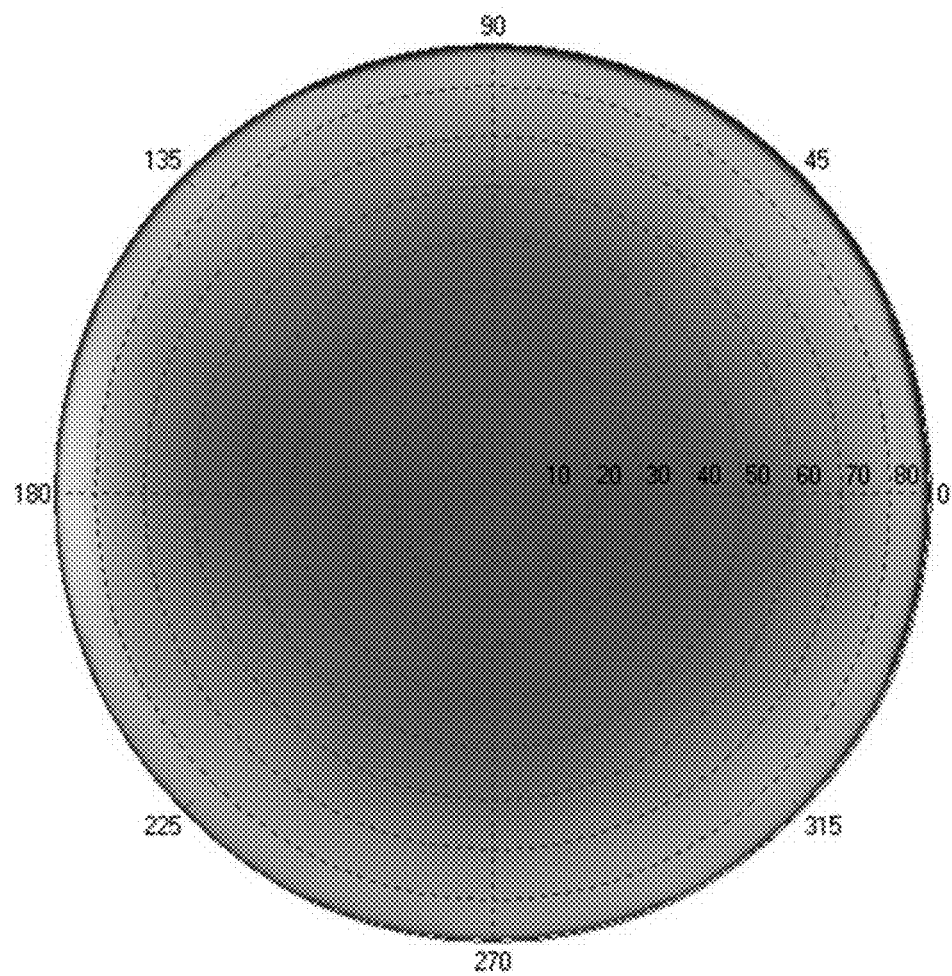
Figure 9:
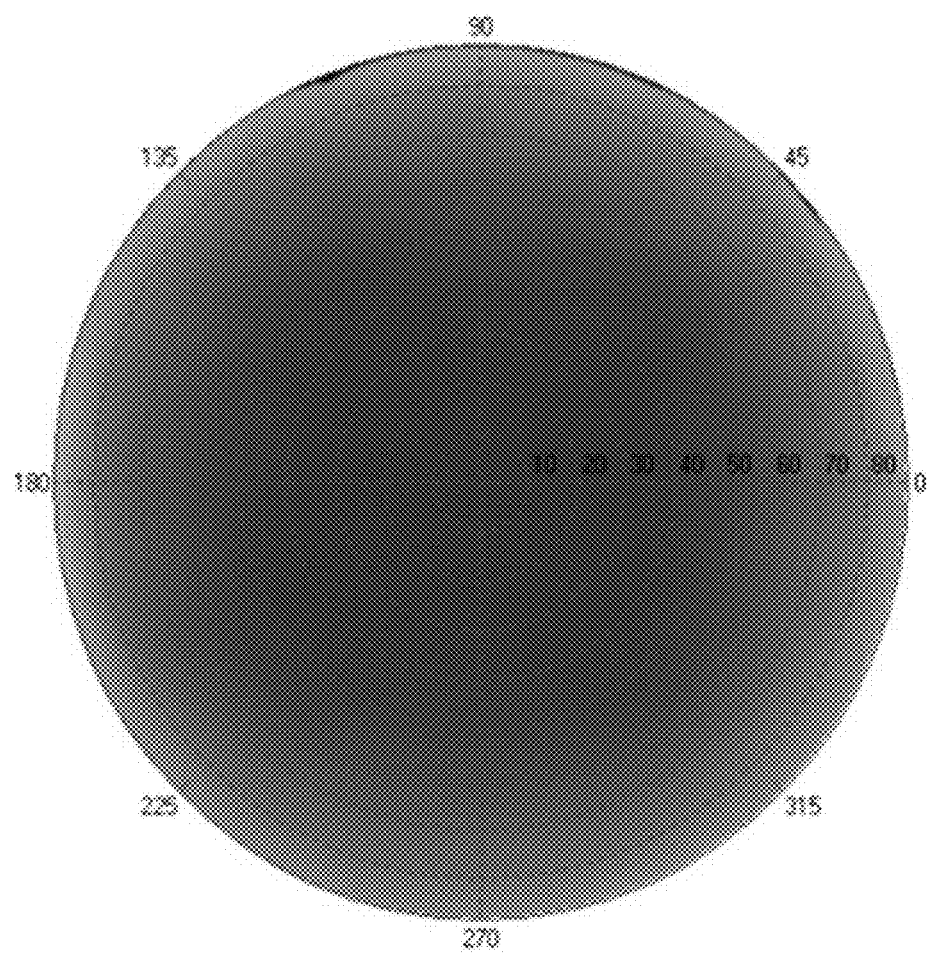

FIGS. 3 to 6 illustrate reflective luminance for COP, Acryl, PC1, and EX, respectively, and it may be seen that the reflective luminance of EX shown in FIG. 6 is lower than that of the comparative examples of COP, Acryl, and PC1. The reflective luminance for incident angle of about 8 degrees was about 5.3%, about 4.8%, about 5.7%, and about 4.8% respectively for COP, Acryl, PC1, and EX.

Figure 10:
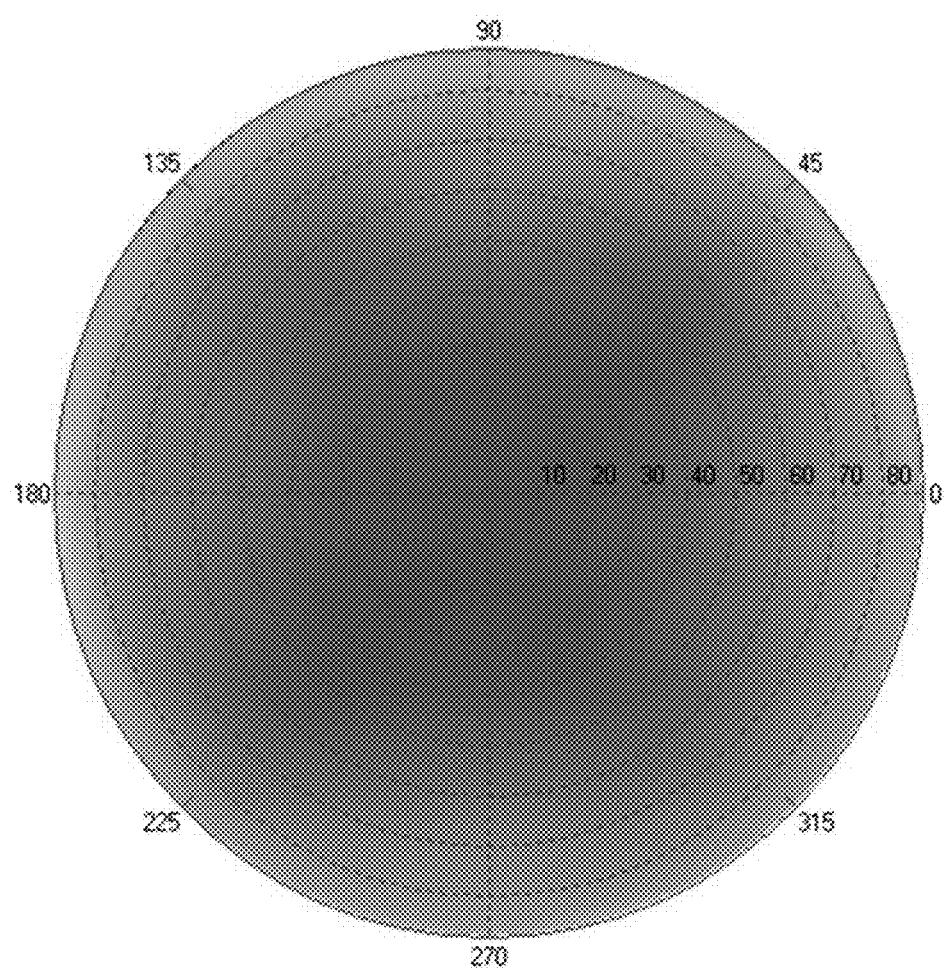
Figure 11:
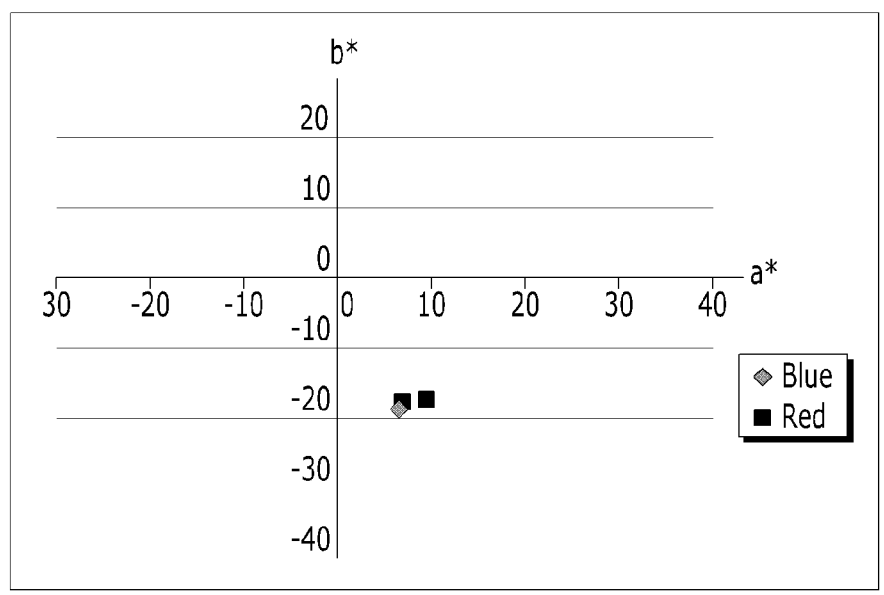
FIGS. 11 to 14 are graphs showing color coordinates representing reflective color for incident angle of about 8 degrees for experimental optical compensation films and comparative optical compensation films.
Figure 12:
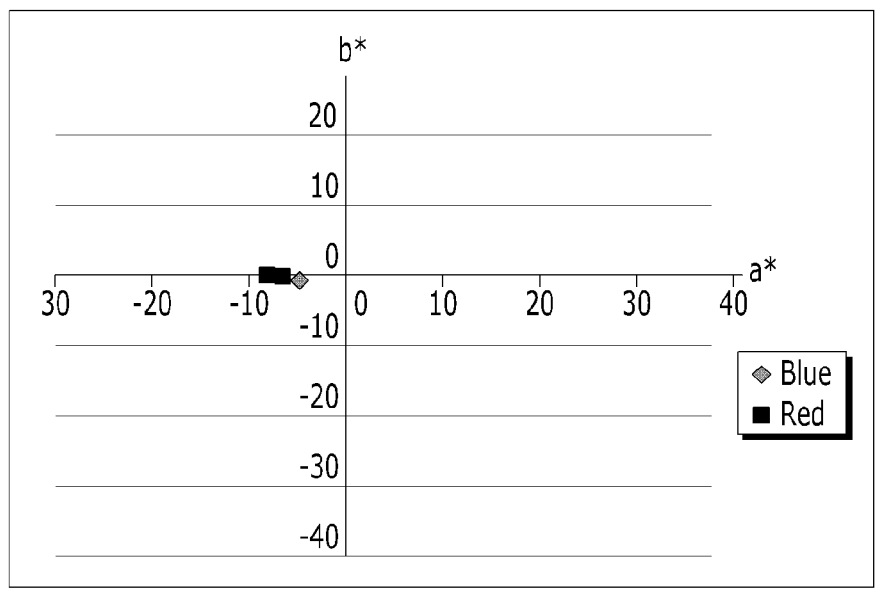
Figure 13:
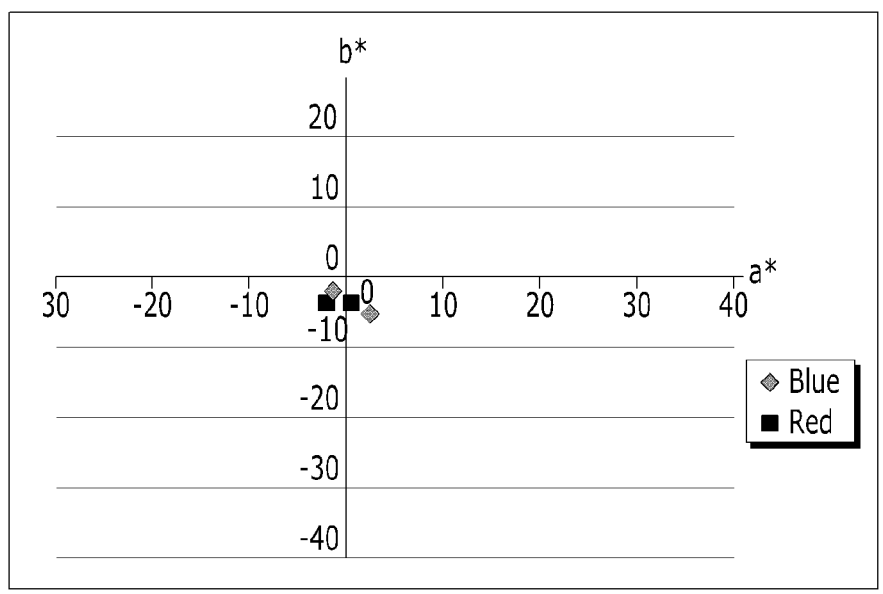

FIGS. 7 to 10 show reflective color for COP, Acryl, PC1, and EX, respectively, and it may be seen that the reflective color for EX shown in FIG. 10 is relatively close to achromatic color.

FIG. 11 to FIG. 14 show reflective color for incident angle of about 8 degrees respectively for COP, Acryl, PC1, and EX, and it may be seen that the reflective color for EX shown in FIG. 14 is relatively close to original color. In FIGS. 11 to 14, positive and negative directions of an axis a* denote red and green colors, respectively, and positive and negative directions of an axis b* denote blue and yellow colors, respectively. A distance of the reflective color from origin was about 19.7, about 6.2, about 4.0, and about 5.0, respectively for COP, Acryl, PC1, and EX.

Next, a spectrum of reflectance (in percent, %) versus wavelength (in nm) for an incident angle of about 8 degrees for the experimental and comparative optical compensation films was measured and is shown in FIG. 15.

As shown in FIG. 15, the experimental optical compensation film (EX) has low reflectance for almost all wavelengths, as compared to the comparative optical compensation films (COP, Acryl, PC1 and PC2).

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical compensation film comprising:
a first layer having positive birefringence;
a second layer on the first layer and having negative birefringence; and
a third layer on the second layer and having positive birefringence,
wherein a retardation value of the optical compensation film for incident light having a wavelength of about 550 nanometers, is about 135 nanometers to about 145 nanometers, and
a ratio of a thickness of the first layer or of the third layer, to a thickness of the second layer, is about 1.1 to about 2.2.

2. The optical compensation film of claim 1, wherein a difference of the thickness of the first layer and the thickness of the third layer is equal to or smaller than about 2 microns.

3. The optical compensation film of claim 2, wherein a refractive constant ($N_z$) of the optical compensation film is about 1.

4. The optical compensation film of claim 3, wherein the first layer and the third layer comprise at least one of cyclo-olefin homopolymer and cyclo-olefin copolymer.

5. The optical compensation film of claim 4, wherein
the second layer comprises a denatured polystyrene copolymer resin, and
the denatured polystyrene copolymer resin comprises styrene repeating units in an amount equal to or greater than about 80 mole percent.

6. The optical compensation film of claim 5, wherein the second layer comprises styrene maleic anhydride.

7. The optical compensation film of claim 6, wherein the first layer and the third layer comprise cyclo-olefin homopolymer, and the second layer comprises styrene maleic anhydride.

8. The optical compensation film of claim 1, wherein
the thickness of each of the first layer and the third layer is about 37 microns to about 64 microns, and
the thickness of the second layer is about 22 microns to about 53 microns.

9. The optical compensation film of claim 8, wherein
a long wavelength dispersion of the optical compensation film is defined as a ratio of a retardation value for incident light having a wavelength of about 650 nanometers to the retardation value for incident light having a wavelength of about 550 nm, and is about 1.04 to about 1.12,
a short wavelength dispersion of the optical compensation film is defined as a ratio of a retardation value for incident light having a wavelength of about 450 nanometers to the retardation value for incident light having a wavelength of about 550 nanometers, and is about 0.79 to about 0.9.

10. An optical compensation film comprising:
a first layer having positive birefringence;
a second layer on the first layer and having negative birefringence; and
a third layer on the second layer and having positive birefringence,
wherein
a retardation value of the optical compensation film for incident light having a wavelength of about 550 nanometers, is about 135 nanometers to about 145 nanometers,
a thickness of each of the first layer and the third layer is about 37 microns to about 64 microns, and
a thickness of the second layer is about 22 microns to about 53 microns.

11. The optical compensation film of claim 10, wherein
a difference between the thickness of the first layer and the thickness of the third layer is equal to or smaller than about 2 microns, and
a refractive constant ($N_z$) of the optical compensation film is about 1.

12. The optical compensation film of claim 10, wherein
the first layer and the third layer comprise at least one of cyclo-olefin homopolymer and cyclo-olefin copolymer, and
the second layer comprises a denatured polystyrene copolymer resin comprising styrene repeating units in an amount equal to or greater than about 80 mole percent.

13. An optical compensation film comprising:
a first material having positive birefringence; and
a second material having negative birefringence,
wherein
a reference wavelength retardation value of the optical compensation film is a retardation value for incident light having a wavelength of about 550 nanometers, and is about 135 nm to about 145 nm, and a long wavelength dispersion of the optical compensation film is defined as a ratio of a retardation value for incident light having a wavelength of about 650 nanometers to the reference wavelength retardation value, and is equal to or greater than about 1.04.

14. The optical compensation film of claim 13, wherein a short wavelength dispersion of the optical compensation film is defined as a ratio of a retardation value for incident light having a wavelength of about 450 nanometers to the reference wavelength retardation value, and is equal to or lower than about 0.9.

15. The optical compensation film of claim 14, wherein
the long wavelength dispersion of the optical compensation film is about 1.04 to about 1.12, and
the short wavelength dispersion of the optical compensation film is about 0.79 to about 0.9.

16. The optical compensation film of claim 15, wherein
a refractive constant ($N_z$) of the optical compensation film is about 1,
the first material comprises cyclo-olefin homopolymer, and
the second material comprises styrene maleic anhydride.

17. The optical compensation film of claim 13, wherein
the first material defines a first layer and a second layer of the optical compensation film,
the second material defines a third layer of the optical compensation film and is between the first layer and the second layer, and
a ratio of a thickness of one of the first layer and the second layer to a thickness of the third layer is about 1.1 to about 2.2.

18. A display device comprising:
a display panel comprising a pair of electrodes and a medium layer; and
an optical compensation layer on a surface of the display panel, wherein the optical compensation layer comprises:
  a first layer having positive birefringence;
  a second layer on the first layer and having negative birefringence; and
  a third layer on the second layer and having positive birefringence,
wherein
a retardation value of the optical compensation layer for incident light having a wavelength of about 550 nanometers is about 135 nanometers to about 145 nanometers, and
a ratio of a thickness of the first layer or of the third layer to a thickness of the second layer is about 1.1 to 2.2.

19. The display device of claim 18, wherein
the thickness of each of the first layer and the third layer is about 37 microns to about 64 microns, and
the thickness of the second layer is about 22 microns to about 53 microns.

20. The display device of claim 19, wherein
a long wavelength dispersion of the optical compensation layer is defined as a ratio of a retardation value for incident light having a wavelength of about 650 nanometers to the retardation value for incident light having a wavelength of about 550 nanometers, and is about 1.04 to about 1.12, and
a short wavelength dispersion of the optical compensation layer is defined as a ratio of a retardation value for incident light having a wavelength of about 450 nanometers to the retardation value for incident light having a wavelength of about 550 nanometers, and is about 0.79 to about 0.9.

21. The display device of claim 18, further comprising a polarization layer on the optical compensation layer.

22. The display device of claim 18, wherein the medium layer comprises organic light emitting material.

* * * * *